United States Patent [19]
Cameron

[11] Patent Number: 6,094,026
[45] Date of Patent: Jul. 25, 2000

[54] OVERTEMPERATURE WARNING CYCLE IN OPERATION OF POLYPHASE DC MOTORS

[75] Inventor: Scott W. Cameron, Milpitas, Calif.

[73] Assignee: STMicroelectronics, Inc., Carrollton, Tex.

[21] Appl. No.: 08/191,060

[22] Filed: Feb. 2, 1994

Related U.S. Application Data

[63] Continuation of application No. 07/937,530, Aug. 28, 1992, abandoned.

[51] Int. Cl.⁷ ........................................................ H02P 1/04
[52] U.S. Cl. ............................................................... 318/471
[58] Field of Search ..................................... 318/471, 434; 388/804, 805, 811, 812, 819, 814, 820, 903, 934; 361/23, 25, 27, 103, 105

[56] References Cited

U.S. PATENT DOCUMENTS

| | | | |
|---|---|---|---|
| 3,673,538 | 6/1972 | Faxon | 361/25 |
| 3,860,861 | 1/1975 | Gucker | 361/25 |
| 4,085,594 | 4/1978 | Mayer | 318/471 |
| 4,253,130 | 2/1981 | Newell | 361/27 |
| 4,459,519 | 7/1984 | Erdman | 318/254 |
| 4,472,666 | 9/1984 | Akeda et al. | |
| 4,542,324 | 9/1985 | Leuthen | |
| 4,831,313 | 5/1989 | Beilfuss | 388/903 X |
| 4,955,431 | 9/1990 | Saur et al. | 388/934 X |
| 5,014,335 | 5/1991 | Anton | 388/934 X |
| 5,115,388 | 5/1992 | Shigekane | 361/106 |
| 5,123,080 | 6/1992 | Gillett et al. | 388/934 X |
| 5,123,081 | 6/1992 | Bachman et al. | 361/106 |
| 5,296,789 | 3/1994 | Ohi | 388/934 X |

FOREIGN PATENT DOCUMENTS

| | | |
|---|---|---|
| 3147905 | 6/1982 | Germany. |
| 4116254 | 5/1990 | Germany. |
| 4116254 | 11/1991 | Germany. |
| 2223636 | 11/1990 | United Kingdom. |

*Primary Examiner*—Jonathan Salata
*Attorney, Agent, or Firm*—Theodore E. Galanthay; Lisa K. Jorgenson; Renee M. Larson

[57] ABSTRACT

A method and integrated circuit for providing drive signals to a polyphase dc motor. The integrated circuit is fabricated on a semiconductor substrate for providing drive signals to a polyphase dc motor. The circuit includes a coil drive circuit for connection to drive coils of the motor to selectively supply drive currents thereto in a predetermined sequence. A sequencer circuit commutatively selects the drive coils to which the drive currents are selectively supplied, and a motor speed controlling circuit controls the speed of the motor by controlling the speed of commutation. A temperature sensing element, such as a diode, is fabricated in the substrate to indicate the temperature of the substrate, and a temperature measuring circuit is connected to the temperature sensing element and to the motor speed controlling circuit to operate the motor speed controlling circuit to slow the speed of the motor when the temperature of the substrate exceeds a first predetermined temperature. If desired, temperature measuring circuit can include a circuit for measuring a second temperature higher than the first predetermined temperature to operate a shut down circuit to turn off the motor if the substrate temperature is too high.

2 Claims, 2 Drawing Sheets

OVERTEMPERATURE WARNING CYCLE IN OPERATION OF POLYPHASE DC MOTORS

The present application is a continuation of application Ser. No. 07/937,530, filed Aug. 28, 1992, now abandonded.

BACKGROUND OF THE INVENTION

1. Field of the Invention

This invention pertains to improvements in motor driving and controlling circuitry, and more particularly, to an improved circuit and method for detecting overtemperature conditions of the substrate on which motor driver circuitry is fabricated.

2. Technical Background

The present invention pertains to polyphase dc motors, and particularly to brushless, sensorless polyphase dc motors which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils connected in a "Y" configuration, although actually, a larger number of stator coils are usually employed with multiple motor poles. In operation, the coils are energized in sequences in which current paths are established through various coils combinations, in, for instance, six commutation sequences.

Typically, the driver transistors that supply the driving current to the coils of the motor are integrated onto a semiconductor substrate, as a part of an overall driver circuit. It will be appreciated, however, that substantial currents may flow in the drive transistors, as well as flyback energy from the coils being dissipated in the transistors, or associated diode elements. This results in heat being delivered to the substrate that must be dissipated to avoid damage to the circuit. Nevertheless, under certain conditions, the substrate may be heated to an undesirable level, requiring complete shut down of the circuit to avoid permanant damage.

In the past, temperature sensing has typically been used in motor driver circuits as a part of a shut down function. When an overtemperature condition occurred, it was detected and all of the operations of the driver circuit were immediately discontinued. In many instances, however, it might be possible to control the substrate temperature to prevent its reaching the critical shut down temperature, and the inconveniences resulting from complete circuit shut-down.

SUMMARY OF THE INVENTION

In light of the above, therefore, it is an object of the invention to provide an improved method and circuit for driving a polyphase dc motor.

It is another object of the invention to provide a method and circuit of the type described that detects heating of the driving circuit and provides a warning prior to shut down of circuit operation.

It is still another object of the invention to provide a method and circuit of the type described that provides both a warning as temperature of the circuit increases as well as a shut down if the temperature exceeds a predetermined limit.

It is another object of the invention to provide a method and circuit of the type described that can be integrated onto an integrated circuit chip together with other motor driving circuitry.

These and other objects, features, and advantages will become apparent to those skilled in the art from the following detailed description when read in conjunction with the accompanying drawings and appended claims.

According to one embodiment of the invention, a warning signal has been included as a part of the temperature sensing features of the motor driving chip, in addition to the shut down function. Thus, when the chip heats to a warm level below the shut down level, an "over temperature warm" signal is generated. Thereafter, if the chip heats up further to a "hot level", another signal "over temperature shut down" is developed. Thus, the first signal can be used as a warning before the chip is shut down by the second signal. The two signals can be used as follows. When a warning "over temperature warm" signal is generated, the motor can be directed to slow down, thereby reducing the power dissipation in the chip. If the chip is heating up due to its own internal power dissipation, then the warning signal can be used to start a digital control loop through three successive states. The first state slows the motor down until the power dissipation is reduced to a level such that the chip is cool enough for the over temperature warm signal to go away. The second state holds the speed at the reduced speed until it is needed to go back to its original controlled speed. The third state takes the speed back up to the desired value at which the motor can be returned to the original run state.

According to a broad aspect of one embodiment of the invention an integrated circuit fabricated on a semiconductor substrate for providing drive signals to a polyphase dc motor is presented. The circuit includes a coil driver circuit for connection to drive coils of the motor to selectively supply drive currents thereto in a predetermined sequence. A sequencer circuit commutatively selects the drive coils to which the drive currents are selectively supplied. A motor speed controlling circuit controls the speed of the motor. A temperature sensing element, such as a diode, is fabricated in the substrate to indicate the temperature of the substrate, and a temperature measuring circuit is connected to the temperature sensing element and to the motor speed controlling circuit to operate the motor speed controlling circuit to slow the speed of the motor when the temperature of the substrate exceeds a first predetermined temperature. If desired, temperature measuring circuit can include a circuit for measuring a second temperature higher than the first predetermined temperature to operate a shut down circuit to turn off the motor if the substrate temperature is too high.

In one embodiment, the motor speed controlling circuit comprises a source of clock pulses at first and second frequencies, the second frequency being less than the first frequency. The clock pulses operate the sequencer circuit, the clock pulses being normally connected to apply the first frequency to the sequencer circuit. If the temperature measuring circuit determines that the first temperature has been exceeded, the second frequency is selectively applied to the sequencer circuit.

According to another preferred embodiment of the invention, a method for operating a disk-drive having a motor driven by a driver circuit integrated on a semiconductor substrate is presented. According to the method, the motor is operated at a normal speed unless a temperature of the semiconductor substrate has exceeded a first predetermined temperature. If the temperature of the semiconductor substrate is detected to exceed the first predetermined temperature, the speed of the motor is slowed. As the speed of the motor is slowing, the temperature of the semiconductor substrate is detected until it falls below a second predetermined temperature. When the temperature of the semiconductor substrate is detected to fall below the second predetermined temperature, the speed of the motor is maintained at the slowed speed. Thereafter, upon demand for use of the disk-drive, the speed of the motor is increased to the normal speed.

BRIEF DESCRIPTION OF THE DRAWINGS

The invention is illustrated in the accompanying drawings in which.

DETAILED DESCRIPTION OF A PREFERRED EMBODIMENT

Figure 1:
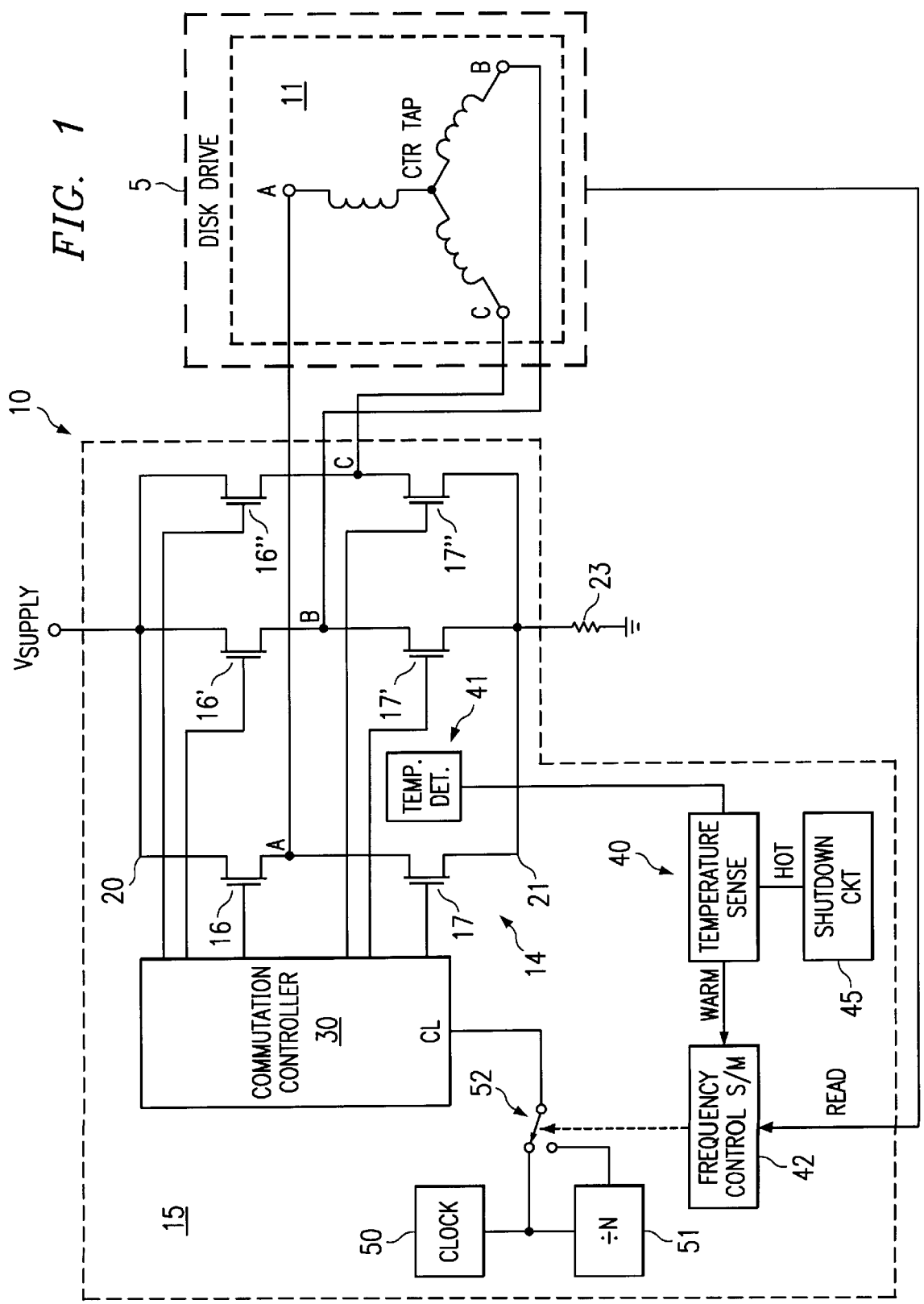
FIG. 1 is an electrical schematic diagram showing a typical motor driver circuit and including an over temperature detecting circuit, in accordance with the invention.

A preferred embodiment of the invention is shown in FIG. 1 in which a motor driver circuit 10 is used in conjunction with a motor (not shown) in a disk drive 5, where the motor has "Y" connected stator windings 11. The circuitry 10 can be integrated, if desired, on a semiconductor substrate 15, denoted by the dotted lines in closing the circuit 10. The motor can be, for example, a polyphase brushless, sensorless, dc motor known in the art. the Y connected windings are denoted as having end terminals A, B, C, and a center tap connection "CTR tap".

Drive signals are supplied to the stator windings by a driver circuit 10 that includes a transconductance loop 14, as known in the art. The transconductance loop 14 includes a plurality of upper driver transistors 16, 16', and 16" and lower driver transistors 17, 17', and 17". In the embodiment illustrated the transistors 16 . . . , 17 . . . are power field effect transistors having their source and drain paths connected between a supply rail 20 and a reference potential rail 21. A sense resistor 23 is connected between the reference potential rail 21 and ground. The transistors 16 . . . , 17 . . . are sequentially energized by a commutation controller circuit 30. Details of such commutation controller circuit are shown in copending patent application Ser. No. 07/770,576, filed Oct. 3, 1991, by the applicant hereof, and assigned to the assignee hereof, said patent application being incorporated herein by reference.

The output from the circuit 14 is taken from the interconnections of the respective transistors 16 . . . , 17 . . . at nodes A, B, and C. The nodes A, B, and C are connected to respective stator terminals A, B, and C of the motor. Thus, as the commutation controller sequences the conduction of the various transistors 16 . . . , 17 . . . , and a predetermined commutation sequence, current is caused to flow in various combinations of the stator coils 11 to produce the desired rotation of the rotor of the motor.

Figure 4:
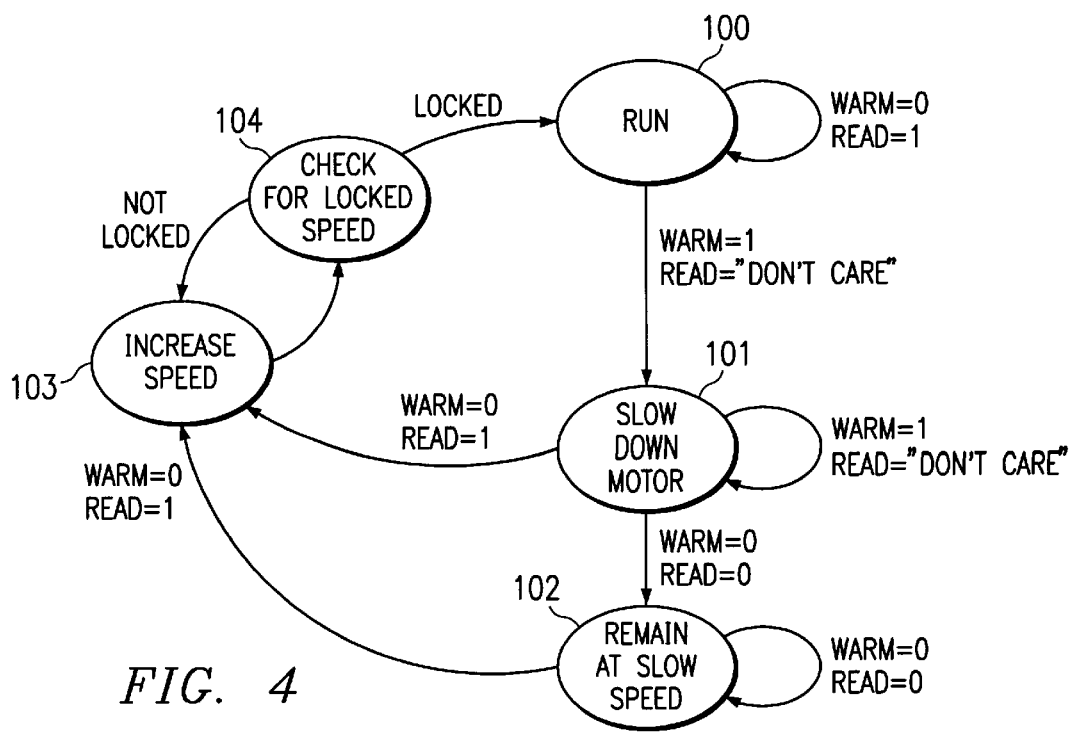
FIG. 4 is a state diagram illustrating the operation of a motor incorporating the over temperature features of the invention.

Additionally, in the circuit of FIG. 1, a temperature sense circuit 40 is included. The temperature sense circuit 40 includes a temperature detector 41 that can be, for example, a diode mounted in the substrate on which the circuit 10 is integrated. The resistance of the diode is dependent upon the temperature of the substrate, which, in turn, is dependent in part, upon the current flowing in the power transistors 16 . . . , 17 . . . The temperature sense circuit 40 has two outputs, one to indicate that a "hot" over temperature condition exists to activate a shut down circuit 45. The other output from the temperature sense circuit 40 is a "warm" over temperature signal that is delivered to frequency control state machine 42 to control the frequency of clock circuit 50. Frequency control state machine 42 also receives a READ signal from disk drive 5, for control in the manner described hereinbelow relative to FIG. 4. And the embodiment shown, a frequency divider 51 is provided to which the clock signals from the clock 50 are delivered. In the presence of a "warm" over temperature signal from the temperature sense circuit 40, a switch 52 is activated to deliver a divided clock frequency to the commutation controller 30, rather than the normal clock frequency. Since the lower frequency is applied to the commutation controller 30, the sequencing of the various transistors 16 . . . , 17 . . . is lowered, thereby reducing the current drawn through the transistors in their respective commutation sequences, thereby reducing the temperature in the substrate.

By reducing the frequency of commutation of the commutation controller 30, the rotation of the motor is reduced.

Figure 2:
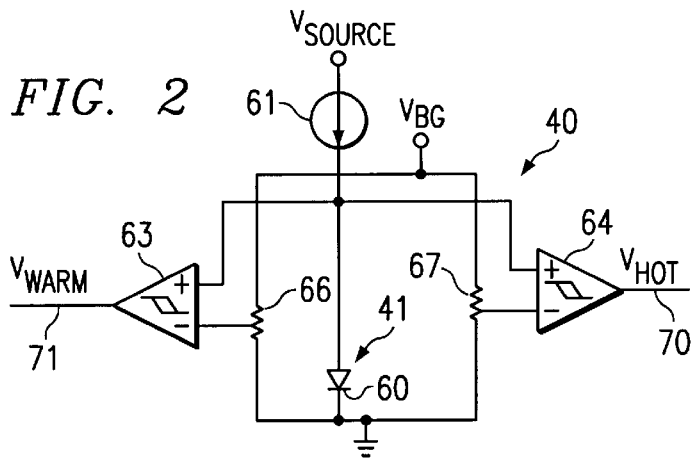
FIG. 2 is an electrical schematic diagram showing a circuit for generating the over temperature signals in accordance with the invention.

Details of the temperature sense circuit 40 are shown in FIG. 2. The temperature detector 41, as mentioned above, can be a diode 60 connected at one end to ground and at the other end to a constant current source 61. The diode 60 is constructed such that its forward resistance is dependent upon the temperature of the substrate in which it is constructed. The cathode of the diode 60 is connected to the non-inverting inputs of comparators 63 and 64.

The non-inverting inputs of the respective comparators 63 and 64 receive a voltage from a resistive voltage divider, 66 and 67, respectively. The voltage divider 66 provides a reference voltage to the comparator 63 that is less than the reference voltage provided by the voltage divider 67 to the comparator 64. The output from the comparator 63 provides a warning signal that the temperature of the substrate has reached a first predetermined threshold, less than the threshold at which it would be desired to discontinue operation of the circuit entirely. The output of the comparator 64, on the other hand, is a over temperature signal indicating that the maximum desired operating temperature has been reached. The output from the comparator 64 on line 70 can be connected, if desired, to a shutdown circuit 45 (see FIG. 1) to disconnect power entirely from the circuit 10. On the other hand, the output from the comparator 63 on line 71 is connected to operate the switch 52 to lower the clock frequency and therefore the drive current through the respective drive transistors 16 . . . 17 . . .

The comparator 63 and 64 each have a certain degree of hysterises designed into their operation; consequently, after each of the comparators 63 or 64 has changed state, it will not resume its original state until a sufficiently lower voltage difference is applied to its input terminals than caused the original warning signal to be produced.

Figure 3:
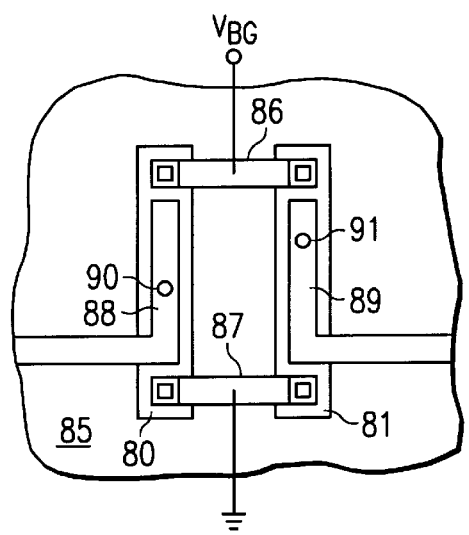
FIG. 3 is a plan view of a portion of a semiconductor substrate containing temperature sensing resistors for use in the circuit of FIG. 2.

Details of the resistive voltage dividers are shown in FIG. 3, in which diffused areas 80 and 81 are formed in a semiconductor substrate 85. The top and bottom portions of the diffusions 80 and 81 are interconnected, for example, by metalization 86 and 87. Additionally, "L" shaped members 88 and 89 are formed extending over the diffusions 80 and 81, isolated therefrom, for example, by a layer of oxide (not shown) or other insulating layer. The respective thresholds of the comparators 63 and 64, and, therefore, the respective temperature thresholds of the "warm" and "hot" over temperature conditions, can be selected by locating an interconnecting elements 90 and 91 extending through the conductors 88 and 89 and the oxide there beneath to contact the diffused layers 80 and 81. Thus, the thresholds can be programmed at the metalization step in the formation of the integrated circuit containing the circuitry 10. Although the structure shown in FIG. 3 is preferred, it will be apparent that the voltage divider function provided or served by the resistor 66 and 67 can be provided by other electrical structures, such as discrete components, or their equivalent structures.

A state diagram of the operation of the circuit 10, used in a computer disk environment, such as a hard disk drive 5 under the control frequency control state machine 42 as shown in FIG. 1, assumes that the initial state of the motor is "run" 100. In this state, if no "warm" over temperature condition exists (warm equals zero) and that the disk is ready to receive a read or write command (read equals one) the circuit will remain in the run state 100. If, however, the "warm" over temperature signal changes state (warm equals one), regardless of the read state (read equals "don't care") the motor will be caused to slow down in the manner described above, in a "slow down motor" state 101. The motor will remain in the "slow down motor" state 101 so long as the "warm" over temperature state exists (warm equals one) regardless of the read state (read equals "don't care").

Once the motor has been slowed to a speed sufficient to allow the temperature of the substrate to drop to a level at which the "warm" over temperature signal has been removed, if the read condition is not active (warm equals zero, read equals zero), the motor is required to remain at the slow speed in state 102. The circuit will remain in the "remain at slow speed" state 102 so long as the "warm" over temperature signal remains low and the read operation is inactive. On the other hand, from either the "slow down motor" state 101 or the "remain at slow speed" state 102, if the read signal is activated and the "warm" over temperature signal remains off (warm equals zero, read equals one) the speed of the motor is increased at an "increase speed" state 103. As the speed of the motor is increased, it is continuously checked for its locked speed and the speed increased until lock is achieved, and the "check for lock speed" condition 104. Once the lock speed has been achieved, the circuit is returned to the original run state 100 for normal operation.

Although the invention has been described and illustrated with a certain degree of particularity, it is understood that the present disclosure has been made only by way of example, and that numerous changes in the combination and arrangement of parts may be resorted to by those skilled in the art without departing from the spirit and scope of the invention as hereinafter claimed.

What is claimed is:

1. An integrated circuit fabricated on a semiconductor substrate for providing drive signals to a polyphase dc motor, comprising:

a driver for sequentially supply drive currents to drive coils of the motor;

a commutation controller for commutatively selecting, at first and second frequencies, the drive coils to which the drive currents are sequentially supplied by the driver, said first frequency being higher than said second frequency;

a temperature sensing element fabricated in said substrate to indicate the temperature of said substrate;

a temperature measuring circuit connected to said temperature sensing element and to said commutation controller, for causing the commutation controller to operate at the second frequency responsive to the temperature of the substrate exceeding a first threshold temperature and for subsequently causing the commutation controller to operate at the first frequency responsive to the temperature of the substrate falling below a second threshold temperature, the second threshold temperature being lower than the first threshold temperature, wherein said temperature measuring circuit comprises a comparator connected to receive a reference potential on one input and a voltage across the temperature sensing element on another input and wherein said comparator has a hysteresis characteristic corresponding to the difference between said second predetermined threshold temperature and said first predetermined temperature.

2. An integrated circuit fabricated on a semiconductor substrate for providing drive signals to a polyphase dc motor, comprising:

a coil driver circuit for sequentially supplying drive currents to drive coils of the motor;

a commutation controller for commutatively selecting, at first and second frequencies, the drive coils to which the drive currents are supplied by the coil driver circuit, said first frequency being higher than said second frequency;

a motor shut off circuit for shutting off the motor;

a temperature sensing element fabricated in said substrate to indicate the temperature of said substrate, wherein said temperature sensing element is a diode and further comprising a constant current source connected to supply current to said diode;

a temperature measuring circuit connected to said temperature sensing element, said temperature measuring circuit comprising:

a first temperature threshold circuit for producing a warm signal to said commutation controller responsive to the temperature of said substrate exceeding a first temperature threshold, said warm signal causing said commutation controller to operate at said second frequency when said first temperature threshold has been exceeded, said first temperature threshold circuit for inactivating said warm signal responsive to the temperature of the substrate falling below a second threshold temperature, causing said commutation controller to operate at said first frequency;

a second temperature threshold circuit for producing a hot signal to said motor shut off circuit responsive to the temperature of said substrate exceeding a third temperature threshold higher than said first temperature threshold, causing said motor shut off circuit to shut off the motor when said third temperature threshold has been exceeded, wherein said temperature measuring circuit comprises first and second comparators connected to receive respective reference potentials on one input and a voltage across the temperature sensing element on another input and wherein each of said comparators has a hysteresis characteristic.

* * * * *